US010762571B2

(12) United States Patent
Luciani et al.

(10) Patent No.: US 10,762,571 B2
(45) Date of Patent: Sep. 1, 2020

(54) USE OF DRONES TO ASSIST WITH INSURANCE, FINANCIAL AND UNDERWRITING RELATED ACTIVITIES

(71) Applicant: METROPOLITAN LIFE INSURANCE CO., New York, NY (US)

(72) Inventors: Terrance C. Luciani, Monroe Township, NJ (US); Barbara A. Distasio, Norwalk, CT (US); John Bungert, Sandy Hook, CT (US); Matt Sumner, Raleigh, NC (US); Thomas L. Bozzo, Fresno, CA (US)

(73) Assignee: METROPOLITAN LIFE INSURANCE CO., New York, NY (US)

( * ) Notice: Subject to any disclaimer, the term of this patent is extended or adjusted under 35 U.S.C. 154(b) by 554 days.

(21) Appl. No.: 14/843,455

(22) Filed: Sep. 2, 2015

(65) Prior Publication Data
US 2016/0063642 A1    Mar. 3, 2016

Related U.S. Application Data

(60) Provisional application No. 62/044,709, filed on Sep. 2, 2014.

(51) Int. Cl.
*G06Q 40/00* (2012.01)
*G06Q 40/08* (2012.01)

(52) U.S. Cl.
CPC .......... *G06Q 40/08* (2013.01); *B64C 2201/12* (2013.01)

(58) Field of Classification Search
CPC ........ G06Q 40/00; G06Q 40/08; G06Q 50/16; G06Q 30/02; G06Q 10/00
See application file for complete search history.

(56) References Cited

U.S. PATENT DOCUMENTS

| 8,346,578 B1* | 1/2013 | Hopkins, III | G06Q 40/00 382/100 |
| 2009/0265193 A1* | 10/2009 | Collins | G06Q 30/0185 705/4 |
| 2011/0046920 A1* | 2/2011 | Amis | G01S 19/17 702/181 |
| 2013/0317865 A1* | 11/2013 | Tofte | G06Q 10/06 705/4 |

OTHER PUBLICATIONS

Geospatial Insight (The role of Geospatial Intelligence in improving the relationship between Policyholder and Insurer: https://www.geospatial-insight.com/wp-content/uploads/Drones-for-Claims-WhitePaper.pdf, Aug. 15, 2002) (Year: 2002).*

* cited by examiner

*Primary Examiner* — Sarah M Monfeldt
*Assistant Examiner* — Mark H Gaw
(74) *Attorney, Agent, or Firm* — Adam P. Daniels, Esq.; Polsinelli PC

(57) ABSTRACT

An unmanned insurance drone can include a drone body and a sensor unit disposed on the drone body to collect sensor data. An on-board data processor converts the sensor data into insurance related information, and a wireless communication unit in communication with the data processor to transmit the insurance related information. In another example, the data processor may not be on the drone but remotely located. The location can be with the pilot or a control collection location. If the insurance related information is separate from the drone, than the wireless communication unit can transmit the raw sensor data to the processor.

6 Claims, 3 Drawing Sheets

USE OF DRONES TO ASSIST WITH INSURANCE, FINANCIAL AND UNDERWRITING RELATED ACTIVITIES

CROSS REFERENCE TO RELATED APPLICATION

The present application is a Non-Provisional application of U.S. Provisional Application Ser. No. 62/044,709, filed on Sep. 2, 2014. The contents of that application is incorporated herein by reference.

FIELD OF THE INVENTION

The present invention relates to the use of unmanned vehicles and robotic assistants to assist in insurance, financial and underwriting related tasks.

BACKGROUND

The use of an unmanned aerial vehicle ("UAV") as well as other unmanned/remotely controlled devices, such as surface, water and rail bound vehicles, and other robotic type assistants (all "drones") are beginning to become a reality. The technology has advanced to the point where the civilian use of airborne drones, for example, is only awaiting final guidelines from the Federal Aviation Administration ("FAA"). Personal air and land devices currently exist and already assist in numerous areas, as well as more complex robotic devices. The use of these drones to assist and improve humans in their daily tasks is limitless. The application of drones to the insurance/financial/underwriting industry can make novel changes on how the industry goes about its daily tasks.

SUMMARY

Thus, to solve the problems noted above, an unmanned insurance drone can include a drone body and a sensor unit disposed on the drone body to retrieve sensor data. An insurance or data processor can process or convert the sensor data into insurance related information, and a wireless communication unit can be in communication with the insurance processor to transmit the insurance data. In another example, the insurance processor may not be on the drone but remotely located. The location can be with the pilot or a control or collection location. If the insurance data processor is separate from the drone, than the wireless communication unit can transmit the raw sensor data to the processor.

A further example of the present invention is a method of insurance adjustment using a drone, which can include the steps of dispatching a drone to an insurance adjustment location. An insurance adjustment location can be any location where insurance, financial, or underwriting activities are being evaluated; specific examples of locations are noted below. The method further includes retrieving the sensor data from the sensor unit disposed on the drone and using the sensor data to perform insurance related functions. The insurance related functions can include at least one of injury determination, property damage determination, compliance with an insurance policy requirement, and fraud detection. It is understood that these specific functions are not mutually exclusive and each share the common goal of facilitating accurate claim adjustment and processing.

BRIEF DESCRIPTION OF THE DRAWINGS

This invention is described with particularity in the appended claims. The above and further aspects of this invention may be better understood by referring to the following description in conjunction with the accompanying drawings, in which like numerals indicate like structural elements and features in various figures. The drawings are not necessarily to scale, emphasis instead being placed upon illustrating the principles of the invention. The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

A UAV can also be referred to as a Remotely Piloted Aircraft ("RPA"), is an aircraft without a human pilot aboard. A UAV's flight can be controlled either autonomously by onboard computers, by the remote control of a pilot on the ground or in another vehicle, or by some combination of autonomous and manual control. A typical launch and recovery method of an unmanned aircraft is by the function of an automatic system or an external operator on the ground. UAVs are often preferred for missions that are too dull, dirty or dangerous for manned aircraft. UAVs, due to the reduced size and complexity, also offer significant cost benefits over conventional manned vehicles. Further, other types of drones, discussed above, can also be used.

Figure 1A:
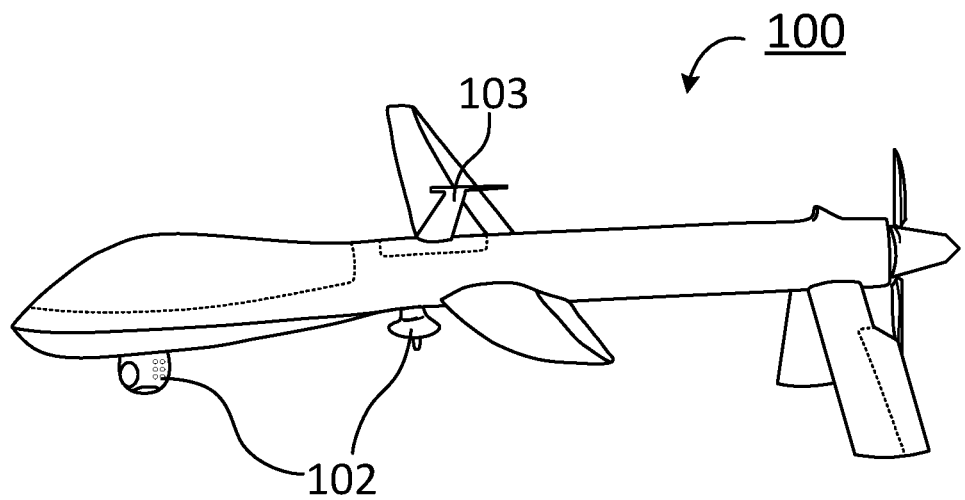
FIG. 1A illustrates a fixed a fixed-wing UAV.
Figure 1B:
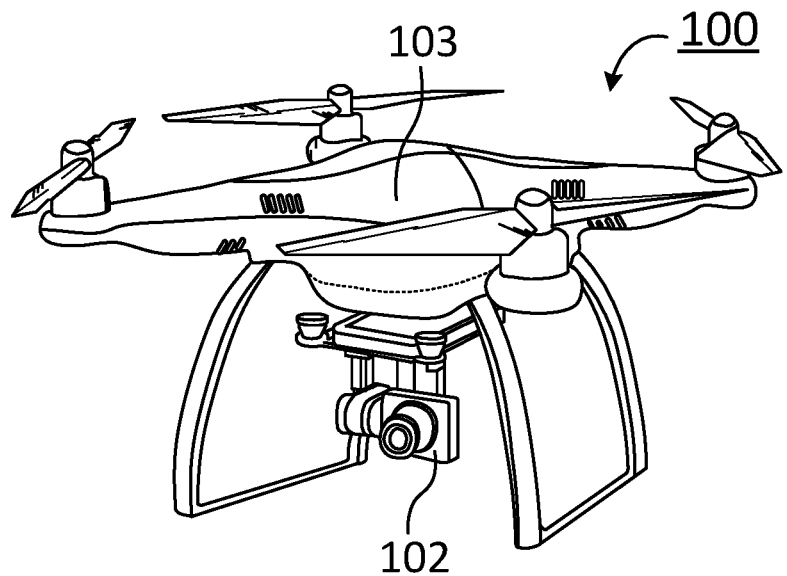
FIG. 1B illustrates a rotor wing UAV.

FIGS. 1A and 1B illustrate typical UAVs 100. In general, they can either be fixed wing (FIG. 1A) or rotor wing (FIG. 1B) aircraft. These, and other drones 100, can be outfitted with any number of sensors 102 to collect sensor data, including cameras, thermal imaging, low-light imaging, photo receptors, radar, etc. The drone can collect other sensor data, for example video, audio, temperature, humidity, wind direction/speed, facial recognition, chemical composition of the soil, etc. This data can be processed internally on the drone with an insurance processor or encoded and wirelessly (through wireless communication unit 103) transmitted to computer systems for processing and interpretation (also by human intervention or a remote insurance processor). The wireless communication unit 103 can allow the drone 100 to send payload sensor data and receive control information and can be configured to communicate on any wireless network, including a radio frequency (RF) or a cellular network. Further, the wireless communication unit 103 can be configured to communicate with one or more ground, air, and/or satellite based transceivers 105 to provide unlimited range between the drone 100 and the base either receiving the data and/or controlling the drone 100.

The insurance processor or data processor can be any programmable calculation device or difference engine (e.g. CPU) designed or programmed to process or determine insurance related information from the data. Alternately examples are that the data processor can convert the sensor data into insurance related information.

Figure 2:
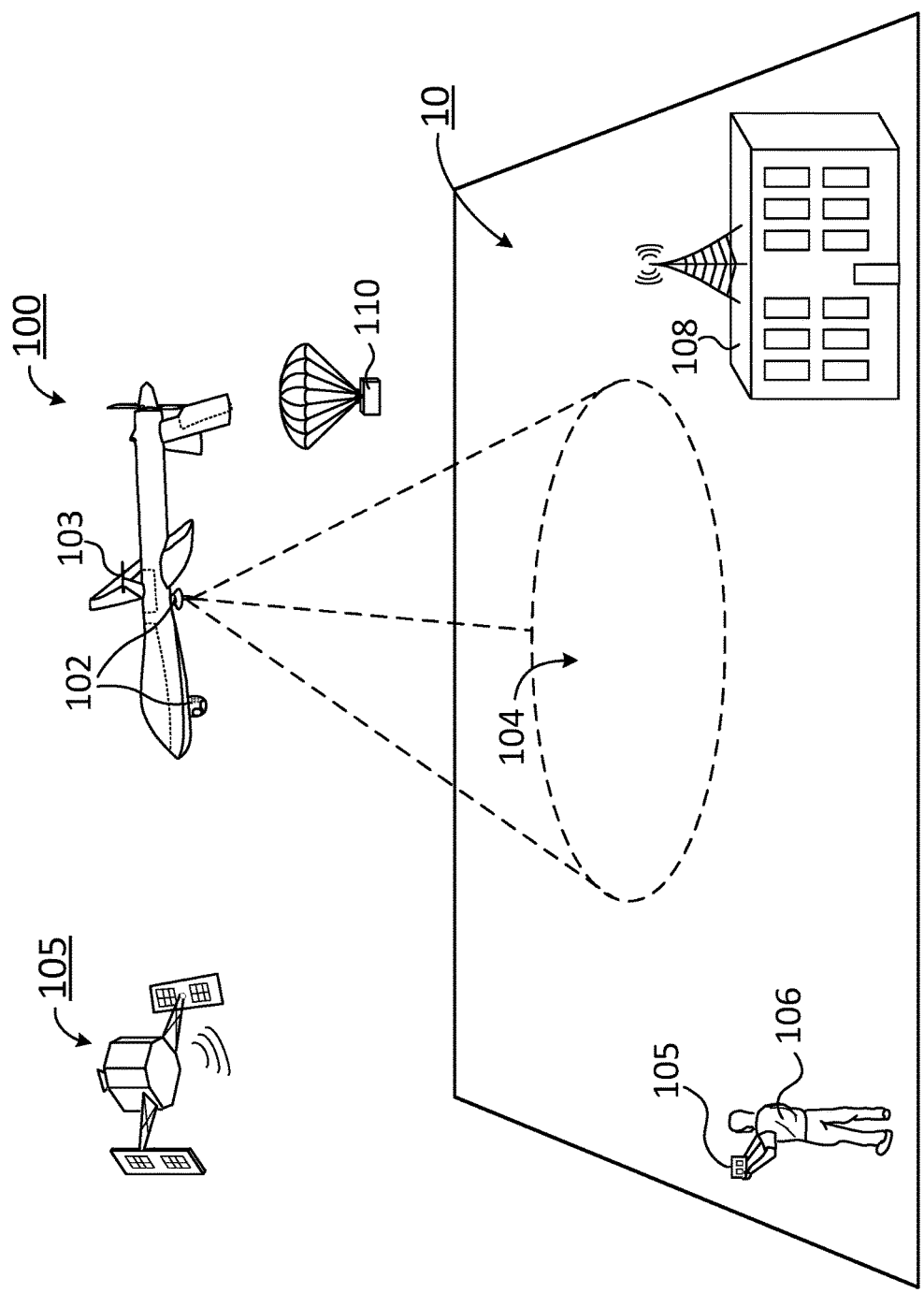
FIG. 2 illustrates a drone surveying a designated area.

The drone 100 can be use in numerous civilian activities related to the insurance and underwriting industry. One benefit of a drone 100 is that it can perform frequent and/or extended surveillance of a designated area (or insurance adjustment location) 10, relatively easily and inexpensively. FIG. 2 illustrates the drone 100 using its sensors 102 to survey a section 104 of the designated area 10. This survey can be done for numerous insurance related activities, as discussed in the below examples. For the insurance and underwriting industries, data regarding the potentially insured and then protecting the assets or person now being insured, is critical to the proper allocation of the insurance policy, premiums and recovery of a claim by the insured. This data is also valuable for verifying claims and assertions made by, or against the insured.

One type of insurance policy insures people. These policies currently cover business people and executives from kidnapping, either at home or in foreign jurisdictions. Future policies may be underwritten to protect children from abduction. Once a person has been insured, one or more drones can be dispatched for safety/security watch. The drones 100 can monitor for the individual insured, or can monitor an area where multiple insured may congregate. The drones 100 can be dispatched by the insurance company at their sole digression or allow the insured to program the drones 100 to serve as escorts and lookouts. In addition, they can be used for tracking and securing people (e.g., nannies, estranged spouses, etc.) and property (e.g. school buses, bicycles, etc.). The use of the drone 100 may be mandated as function of the policy from the insurance company, or may be a consideration for discounts or lower premiums if the insured uses the drone 100 in a manner dictated by the insurance company.

The sensor array 102 in the drone 100 can leverage motion and sound detection to provide alerts, track suspects who commit the alert violation, and inform the parent or insurance company of any deviation from a planned route or schedule. The sensor package 102 can transmit information to a pilot 106 guiding the drone 100 or to an information processing center 108 to allow for sensor input processing. For example, the sensor 102 can be a camera and it can pass images that are then put through a facial recognition program to verify the insured and if any threats are nearing the insured. In addition, the sensors can be linked to a device secured on the insured and can track her movements inside and outside of buildings and other structures.

An additional example allows the drone 100 to detect abnormal activity (e.g. the presence of a threat individual, a deviation from a planned route or schedule, etc.) and communicate directly with law enforcement or security personnel. The communication can be as simple as an alarm, a "911" call, or a full data package of what the drone is detecting, both in real-time and/or in the form of a log.

Other examples for safeguarding an insured, is to monitor them during orienteering or wilderness camping activities. Additionally, the drone can monitor hunting locations for the location of insured hunters and other nearby hunters (e.g. by the use of GPS or color recognition for orange, etc.). In addition, the drone can assist the hunter in tracking wounded animals, all to secure the safety of and to minimize claims from the insured during high risk activities.

In another example, the drone 100 can survey commercial, residential, and agricultural investments. Farms and their crops can be insured against loss and the drones can be used to survey the areas both before, to determine the underwriting strategy, and after, to survey the damage if the crops are devastated by some insured occurrence. Drones 100 can be used as back-up or instead of human security to patrol and monitor insured locations, from busy office buildings to remote locations.

The physical land survey example can be expanded to allow viewing, analyzing and recording large tracks of land to develop an investment value for the land. The investment value can based used as a basis for a policy. Of further importance can be to determine if an existing property has a stated value, as was it was originally provided to the insurance company, for the initial underwriting. Some key features for property value can be the level of hazards and risks on the property and whether or not the land borders are valid. In addition, the drone 100 can review objects on the property of value to the transaction that would otherwise present challenges to the buyer to examine. Examples include machinery on roofs such as air conditioning units and subterranean structures such as well walls.

Hazards and risks can be determined not only from photographic data, but also from topographic and geological data. The proximity to a fault or flood zone, high water tables, the nature of the terrain (e.g. prone to rock slides or sink holes), and just the presence of large mammals (e.g. bears or mountain lions) or uninhabitable areas can change the value of the land and/or affect the amount of coverage one can obtain if they inhabit that area of property.

Other value changing features of property can allow the drone 100 to locate enhanced value land (e.g. have high solar access or high wind for future energy related platforms). Again, this can be expanded to soil surveys and terrain analysis. In certain remote areas deployable sensor packages 110 can be dropped from the drone 100 to take long term, detailed, data collection on any or all of the above, and other, physical parameters. The drone 100 can then return and loiter long enough to collect the deployed package, collect the data from the deployed package 110, or the deployed package 110 can transmit its data directly.

Other examples of the use of drones 100 can be for claim processing of property and/or casualty claims. As the above examples illustrates, drones 100 can be used before or during the insurance coverage underwriting process, however, the drones can also be used at the time of or after a claim has been made.

Figure 3:
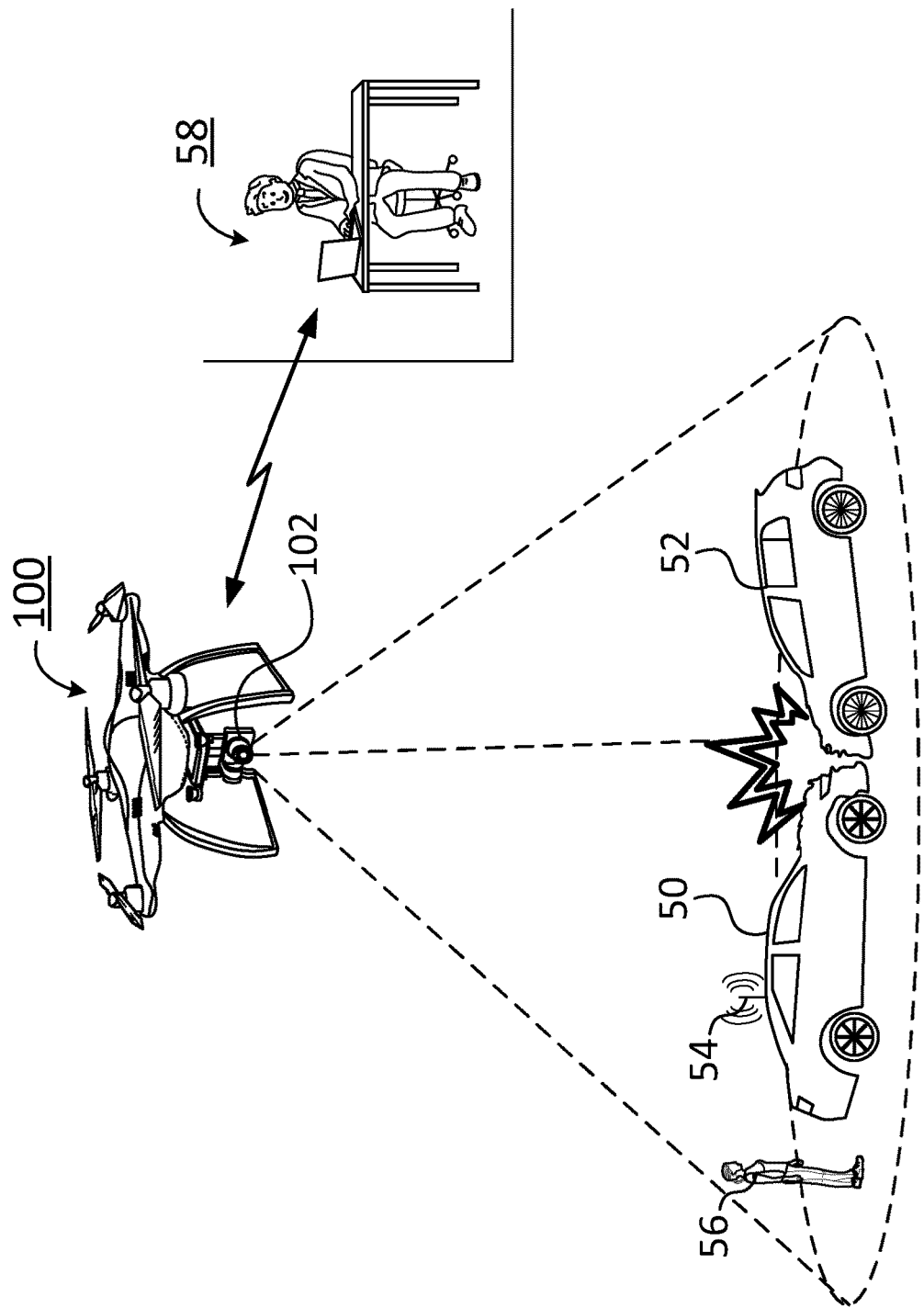
FIG. 3 illustrates a drone and an accident scene.

FIG. 3 illustrates the use of the drone 100 at the scene of an accident. Here, an insured vehicle 50 is involved in a traffic accident with a vehicle 52. The insured vehicle 50 can have a transponder 54 that sends out information at the time of certain events that are indicative of a traffic accident (e.g. airbag deployment, sudden braking, detection of a deformed section of body panel, etc.) or can be linked to a service that performs such collection (e.g. On Star®, etc.). Alternately, the insured, as part of her policy, must inform the insurance company contemporaneously with the accident to be covered (e.g. via a phone call, text, or smart device application).

As soon as the accident notification is received, the insurance company can deploy or retask a drone 100 to the scene. The drone 100 can use its sensors 102 to record the accident scene (e.g., time of day, direction of sun glare, location of traffic control devices, skid marks, etc.) and even identify any witnesses 56. The drone 100 can be interactive with the insured, asking questions, through an application or voice prompt system, on the spot regarding the accident based on the information its collected. The drone 100 can also determine if a police report is appropriate for this type of accident, and if the insured has not called the accident into the police, the drone can suggest the insured do so, or perform the task itself. In another example, an insurance adjuster 58 can be in real-time communication with the drone and/or insured to collect on-the-spot data and ask questions for the insurance report.

An additional example allows the insurance company to monitor insured people with the drone 100 for disability and insurance fraud monitoring. The drone 100 can track an insured to confirm that she is meeting her disability requirements as well as monitoring those suspected of insurance fraud. The tracking can include determining if the insured is making all of her scheduled doctor visits, has her rental vehicle for as long as stated, or is performing activities while claiming an injury. The drone 100 could even be used in an assistance and support model for the customer, providing services such as retrieving mail from a mailbox, walking the dog on the property and securing doors and windows.

In an alternate example, the drone 100 can be used for claims processing in dangerous situations. For large scale disasters (e.g. floods, earthquakes, wildfires, etc.) and other incidents where humans cannot enter, the drone 100 can perform area analysis and begin claims processing. The drone 100 can be used to protect and support humans in assessing damage and analyzing risk related to those situations. Here, as the damage is occurring, the drone 100 can determine the structure and property damage and begin the claims processing even before the disaster has subsided. In this way, needy insured can have their claims initially adjusted to speed up their receipt of insurance funds and lessen the after disaster surge of claimants.

In some examples, the dispatched drones are not under the control of the insurance company, but an extension of the fire or police department to ascertain the movement of a suspect, a hit-and-run vehicle or a wildfire in an area. Conversely, an insurance company drone may be commandeered or co-opted by government officials when necessary for any of the above tasks.

Another portion of drone usage can be more interactive with the insured, and to give some benefit to being under surveillance. The drone 100 can be used to take photos of games and/or individuals in attendance by locking in on an insured phone's GPS signal using an application. This can be used to verify the insured location and become a custom photo platform for events. Wireless signals (e.g. WiFi, Bluetooth®, cellular communication, etc.) can be used to trigger and transmit recorded extended photos and video of an insured or groups of insured.

Any or all of the above examples can have common features and parameters. For example, the operation of the drone 100 can be based on a set of rules and principles. This includes limitations on altitude, proximity to airports and other sensitive areas, the use of video/photos for non-business use, the use of video/photo of people without their consent, the use of drones for tracking and monitoring people without their consent, and the use of drones to cause fear and anxiety. As an additional policy, insurance companies can also offer insurance that protects certified drone providers/companies protecting them from litigation related to these items, in particular during the course of their collection of data for governmental and insurance company uses.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:
1. An unmanned insurance drone, comprising:
a drone body;
a sensor array disposed on the drone body the sensor array including a first sensor configured to capture an image, and wherein the sensor array is communicatively linked to a personal device that tracks physical movements of an insured individual inside and outside of buildings;
an on-board data processor; disposed on the drone body, the on-board data processor is configured to:
monitor an area proximate to the insured individual;
receive the image captured by the first sensor, the image illustrating the insured individual;
analyze the image using a facial recognition program to verify the identity of the insured individual;
determine a threat is approaching the insured individual based on the image;
monitor a path of physical movement by the insured individual based on sensor data captured by the sensor array;
compare the path with a planned route of the insured individual;
determine a first deviation between the path and the planned route;
determine a second deviation between the planned route and a planned schedule of the insured individual;
detect abnormal activity based on at least one of the threat, the first deviation, or the second deviation; and
send a report regarding the abnormal activity to law enforcement over a network; and
a wireless communication unit in communication with the on-board data processor to wirelessly transmit information to an information processing server and information to a pilot guiding the unmanned insurance drone.

2. The unmanned insurance drone of claim 1, wherein the on board processor is further configured to send an alert to law enforcement.

3. An unmanned insurance drone, comprising:
a drone body;
a sensor unit disposed on the drone body configured to capture sensor data;
a wireless communication unit in communication with the sensor unit, the wireless communication unit is configured to:
transmit the sensor data;
transmit information to an information processing server,
transmit information to a pilot guiding the unmanned insurance drone;
receive a real-time request from an insurance adjuster to collect data from an accident scene and ask questions for an insurance report; and
transmit a real-time response from an insured individual at the accident scene; and
an on-board processor in communication with the wireless communication unit, the on-board processor is configured to:
monitor an area proximate to the insured individual;
analyze image data corresponding to the insured individual using a facial recognition program to verify the identity of the insured individual;
determine if the insured individual deviated from a planned schedule;

receive, via the wireless transmission unit, a command from an insurance processor at a remote location;

instruct the unmanned insurance drone to fly to the accident scene where the insured individual is present based on the command;

instruct the sensor unit to record sensor data corresponding to the accident scene;

identify a witness at the accident scene based on the sensor data;

provide interactive communications between the insurance adjuster and the insured individual at the accident scene using a voice prompt system;

determine if a report is appropriate for the accident; and provide the report to law enforcement over a communication network when the report is appropriate.

4. The unmanned insurance drone of claim 3, wherein the sensor data corresponding to the accident scene includes at least one of a time of day, a direction of sun glare, a location of traffic control devices, or skid marks.

5. A method of investigating an accident using a drone, the method comprising the steps of:

transmitting, by a wireless unit of a drone, information to an information processing server;

transmitting, by the wireless unit, information to a pilot guiding the drone;

receiving, by a processor of the drone, a command from an insurance processor at a remote location from the drone to fly to an accident scene where an insured individual is present;

monitoring an area proximate to the insured individual to record sensor data corresponding to the accident scene by a sensor unit of the drone;

analyzing image data corresponding to the insured individual using a facial recognition program to verify the identity of the insured individual;

determining if the insured individual deviated from a planned schedule;

identifying, by the processor a witness at the accident scene based on the sensor data recorded by the sensor unit;

communicating, by the processor one or more questions regarding the accident scene to the insured individual using a voice prompt system, determining, by the processor, a police report is appropriate for the accident scene;

determining, by the processor, the insured individual has not provided a report based on responses to the one or more questions; and providing, by the processor, police report to law enforcement over a network.

6. The method of claim 5, wherein the sensor data corresponding to the accident scene includes at least one of a time of day, a direction of sun glare, a location of traffic control devices, or skid marks.

* * * * *